Feb. 20, 1951 J. MERCIER ET AL Re. 23,343

ACCUMULATOR SHELL SEALING PLUG

Original Filed July 6, 1945

INVENTOR.
JEAN MERCIER AND
EDWARD M. GREER
by his attorney
Howard S. Jenkins

Reissued Feb. 20, 1951

Re. 23,343

UNITED STATES PATENT OFFICE 23,343

ACCUMULATOR SHELL SEALING PLUG

Jean Mercier, New York, and Edward M. Greer, West Hempstead, N. Y.; said Greer assignor to Greer Hydraulics, Inc., Brooklyn, N. Y.

Original No. 2,469,171, dated May 3, 1949, Serial No. 603,546, July 6, 1945. Application for reissue February 18, 1950, Serial No. 145,062

6 Claims. (Cl. 138—30)

Figure 1:
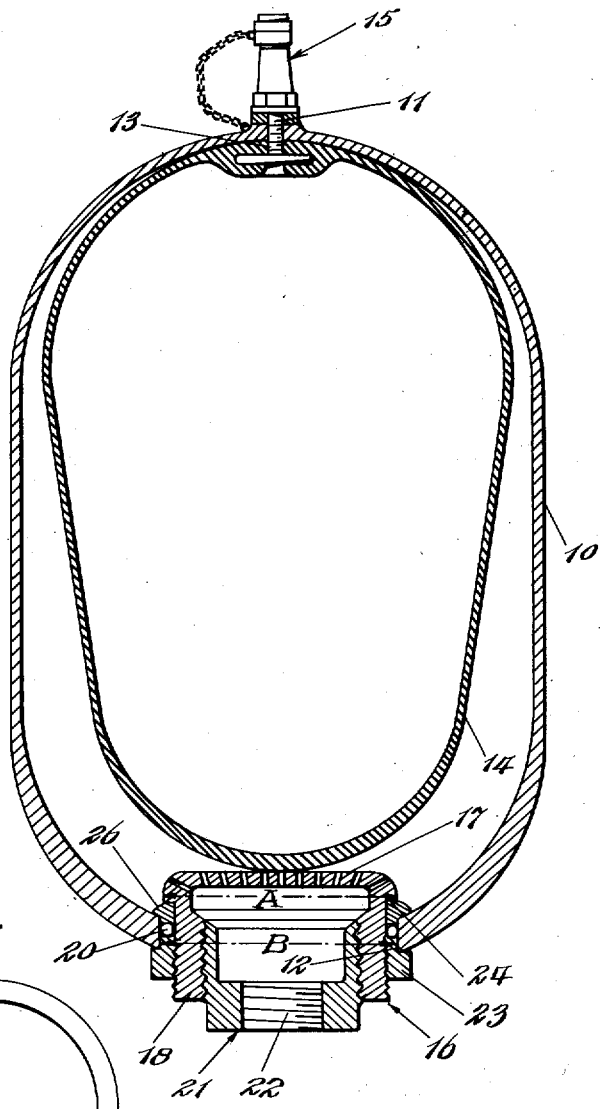

Matter enclosed in heavy brackets [ ] appears in the original patent but forms no part of this reissue specification; matter printed in italics indicates the additions made by reissue.

This invention relates to accumulators [as used in the hydraulic system of airplanes but] *and* more particularly to the component parts of [the] *an* accumulator and the manner of assembling those parts.

An accumulator is a fluid storage device that is connected to a hydraulic system [, its]. *Its* principal function is to provide a surplus supply of the fluid in the system stored at a predetermined pressure so that any leakage in the system is automatically compensated for by the accumulator. The [construction of an] accumulator is usually a pressure vessel with a dividing yieldable wall [,] *or diaphragm* so that air pressure may be charged through a valve to the one side of the yieldable diaphragm and a fluid under pressure may be charged to the other side of the diaphragm. In another form of an accumulator a deformable bag or bladder is used instead of a diaphragm. The bag is affixed to one end of the shell by means of [the] *a* small air valve, *desirably provided with a small* stem. The opposite end of the shell is provided with an oil port. [In this type of construction] *Where the pressure vessel is a single shell,* the deformable bag must be inserted through the larger opening of the oil port and the small air valve passed through a small perforation in the opposite end of the shell. It has been found advantageous to provide a rather large opening at the oil port end of the shell to facilitate the assembly of the bag in the accumulator. In providing a large opening [there has arisen other] difficulties *have arisen,* namely the provision of a safe and tight plug [. Safe in] that [it] will not blow out under extreme pressures within the shell and [tight so that it] will not permit leakage of fluid. The usual manner of closing the oil port end of the accumulator is to provide a large neck end integral with the shell [and internally threaded, into this opening a plug is threadably secured and this plug is] *into which a plug,* provided with the correct size oil port [.] *, is threadably secured.* There are various disadvantages to this type of plug , namely the threads may become worn or stripped [and weaken] *thereby weakening* the strength of such threads [and] *with the result that* when a maximum pressure is attained in the accumulator the plug may be blown out [, another]. *Another* difficulty arises in disassembling, [that is,] *for* the mechanic [does not always] *may not* relieve all the air pressure from the bag and consequently when the plug is partially released by the mechanic it suddenly blows out and may cause injury.

This invention has for an object the provision of an accumulator that is provided with a locking means for the sealing plug at the oil port end.

Another object of this invention is the provision of means to necessitate pushing the oil port plug inward against any resistance to its removal before the plug may be removed.

A still further object of this invention is to provide a quick and easily installed oil port plug that is safely secured to the shell of the accumulator.

Figure 2:
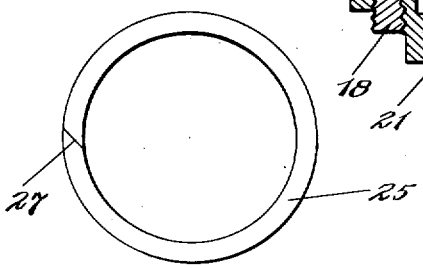

Other objects may be apparent by reference to the accompanying drawings and detailed description in which, Fig. 1 is a cross sectional view of the accumulator, and Fig. 2 is a plan view of the locking ring.

In the embodiment of the invention illustrated in Fig. 1 there is a pressure resistant *vessel illustratively a single* shell 10 with two opposed ports or mouths 11 and 12 [, the]. *The* smaller port 11 is provided for a stem 13 of a [standard] pneumatic valve 15 and the larger port 12 is formed large enough to pass an accumulator bag 14 therethrough. The bag 14 is formed slightly pear [shape] *shaped* or at least smaller than the internal periphery of the shell 10 and is provided with the [standard] pneumatic [valves] *valve* 15 moulded into the larger end portion of the bag.

A circular [strainer] *outlet* plug 16 is provided having its largest diameter "A" (indicated in [dotted] *dot and dash* lines) slightly less than the diameter "B" (indicated in [dotted] *dot and dash* lines) of the large port 12. [The strainer plug] *Plug* 16 [is formed with a large perforated head portion 17 and an extended] *has a reduced* neck portion 18 that is somewhat smaller in diameter [to allow a seal 20 to be interposed between the neck portion 18] *than the diameter "A"* of the plug 16 and [the shoulder of the port 12.] *forms a shoulder 24 at its upper end.*

*Although any suitable type of outlet plug 16 could be used, in the embodiment illustratively shown herein, the plug 16 is formed with a head portion 17 desirably perforated to form a strainer and the neck portion 18 protrudes from port 12.* The neck portion 18 is internally threaded to permit an oil port plug 21 to be threadably secured [, this] *therein, the* plug 21 having the port 22 for securing the fluid line thereto.

[The neck 18 of plug 16 is also externally threaded so that an external nut 23 may be secured thereto. The portion of plug 16 where the neck 18 and the head 17 meet forms a circular shoulder portion 24. A locking ring 25 illustrated in Fig. 2 is provided and is formed with an inside diameter equal to the external diameter of the extended neck portion 18 of the plug 16 of Fig. 1. The ring 25 is also formed with a slight curvature 26 on its upper face as indicated in Fig. 1 so that it fits into the shoulder 24 of the plug 16. The outside diameter of the ring 25 is greater than the diameter "B" of the port 12. The ring 25 is cut through one portion of its circumference as at 27 to permit the installation of this ring through the port 12 which is of smaller diameter. This is done by springing the ring or compressing it, then after it is within the shell it may be expanded.]

*A curved member desirably a locking ring 25 having an outer diameter greater than the diameter "B" of port 12 is constructed so that it may be inserted into said port to encompass neck 18 of the plug. To this end the ring is deformable so that portions thereof are relatively displaceable to permit its introduction into the mouth of port 12 and after it is in said mouth, may be restored to substantially its original shape.*

*Ring 25 has an inner periphery overlapped by said shoulder 24 and intervenes between shoulder 24 and the inner rim of port 12. Although any suitable locking ring of the above type may be used, in the embodiment herein, as shown in Fig. 2, the ring 25 is desirably of resilient material such as spring metal and is split as at 27 so that it may be deformed for insertion into port 12 by compressing the ring 25 to overlap the ends thereof and then after it is within the shell 10 releasing the ring 25 so that it may assume its original shape.*

*The ring is preferably formed so that in cross section, as shown in Fig. 1, it has a cylindrical inner periphery snugly fitting around neck 18 and also desirably has a slight curvature 26 on its upper face that may be seated against the correspondingly curved shoulder 24 of plug 16. The ring also has a shoulder on the outer periphery thereof which may be seated on the inner rim of port 12 and substantially fills the space between the neck portion 18 of the plug 16 and the inner wall of the port 12 to prevent lateral displacement of said plug.*

*With the construction thus described, the ring may be seated aganst the inner rim of said port with said shoulder 24 seated against said ring 25, a nut 23 screwed on the externally threaded protruding portion of neck 18 of plug 16 releasably securing said plug to said shell.*

*Desirably a seal 20 is interposed between the neck portion 18 of the plug 16 and the inner wall of the port and is desirably compressed between the ring 25 and the nut 23 to prevent leakage of oil when the plug is secured to said shell.*

[In assembling the accumulator the shell 10 is empty and a bag 14 may be passed through the opening 12] *In assembling the accumulator a bag 14 may be passed through the opening 12 of the empty shell 10.* The valve stem 13 is pushed up through the opening 11 and a washer and nut are secured to the outside stem and threaded down to clamp the stem in the position indicated in Fig. 1. The plug 16 is then passed through the port 12 and the ring 25 is next compressed and passed through port 12, the ring 25 is then expanded and passed over the neck portion 18 of the plug 16. The plug 16 is then brought down to the position indicated in Fig. 1. The seal 20 is next pressed into the opening 12 around the neck portion 18 of the plug 16. The nut 23 is next threaded on to the external threads of the neck 18 and drawn up tightly to hold the whole assembly 16 in a rigid, tightly sealed relationship. The accumulator is then ready to have the fluid port plug 21 secured thereto and the port 22 connected to a fluid system. The bag 14 is inflated with a prescribed pressure before the accumulator is put into operation.

[In] *As in* disassembling [this] *the* accumulator, it is [absolutely] necessary [to release all air pressure from the bag 14, as in removing the plug 16 it is necessary to push it inward so that the ring 26 may be slipped from the neck 18 and compressed to remove it through opening 12. The plug 16 may then be removed.] *first to push the plug 16 inward so that ring 25 may be slipped from the neck 18 and deformed to remove it through port 12, if there is any air pressure in the bag 14, the latter will press against the outlet plug 16 and prevent displacement thereof.*

It is apparent *therefore* that a mechanic cannot remove the plug 16 with *any substantial* air pressure remaining in the bag 14 [, therefore] *and consequently* there is no danger of injury [from] *as a result of* the plug being blown out *of the shell* during disassembly [.] *, and by reason of the fact that the plug is retained in place by the coaction of shoulder 24 with ring 25, there is no strain on the coacting threads of the plug and the nut and hence there is no likelihood of stripping thereof.*

Although a preferred form has been shown, it is understood that a mechanic working within the scope of *that* which is claimed, may make changes without departing from the spirit of this invention.

What is claimed is:

[1. In an accumulator comprising a shell having two ports, a deformable partition secured within said shell separating said two ports from each other, a strainer plug placed inside the larger of said ports, a split spring locking ring of greater diameter than said largest port placed inside said port, means to secure said strainer plug and locking ring in juxtaposition with the said shell at the periphery of the large port.]

[2. In an accumulator comprising a shell having two ports, a deformable partition secured within said shell separating said two ports, a strainer plug placed inside one of said ports, a split spring locking ring of greater diameter than said port into which said strainer plug is placed, means to seal said strainer plug and locking ring in juxtaposition with the said shell at the periphery of the one port.]

[3. An accumulator according to claim 2 having means to release the air pressure from said air portion to release the force of said deformable partition on said strainer plug, and means to manually remove said split spring locking ring by pushing it inward toward said deformable partition so that said split spring may be compressed and removed through said mounting port to permit removal of said strainer plug.]

*4. An accumulator comprising a shell having two ports, a deformable partition secured within said shell and intervening between said ports, a plug in one of said ports and having a shoulder, the largest diameter of said plug being less than the diameter of said port, a locking member encompassing said plug and having an outer diam-*

*eter greater than that of said port and an inner periphery overlapped by said shoulder and seated in position intervening between said port and said shoulder, said locking member having portions thereof relatively displaceable to permit of introduction thereof into the shell and of such seating, and means releasably to secure said plug to said shell.*

*5. An accumulator comprising a shell having two ports, a deformable partition secured within said shell and intervening between said ports, a plug in one of said ports and having a shoulder, the largest diameter of said plug being less than the diameter of said port, a deformable locking ring of resilient material encompassing said plug and having an outer diameter greater than that of said port and an inner periphery overlapped by said shoulder and seated in position intervening between said port and said shoulder, said ring being split whereby it may be compressed to overlap the ends thereof for insertion into said port and means releasably to secure said plug to said shell.*

*6. The combination set forth in claim 5 in which said locking member is a ring having a shoulder on its outer periphery seated on the inner rim of said port and substantially fills the space between the plug and the inner wall of the port, thereby to prevent lateral displacement of said plug.*

*7. An accumulator comprising a shell having two ports, a deformable partition secured within said shell and intervening between said ports, a plug in one of said ports having a shoulder at its inner end, said plug having a portion extending from said port, the largest diameter of said plug being less than the diameter of said port, a deformable locking ring encompassing said plug and having an outer diameter greater than that of said port and an inner periphery overlapped by said shoulder and seated in position intervening between said port and said shoulder, and a nut threaded on the portion of said plug extending from said port and clamping said locking ring between said shoulder and the inner rim of said port securely to retain said plug in said port.*

*8. The combination set forth in claim 7 in which a seal encompasses said plug and is interposed between said sealing ring and said nut.*

*9. An accumulator comprising a shell having two ports, a deformable partition secured within said shell and intervening between said ports, a plug in one of said ports, the largest diameter of said plug being less than the diameter of said port, said plug having a reduced neck portion extending from said port, the body of said plug forming a shoulder with respect to said reduced portion, a deformable locking ring having an outer diameter greater than that of said port and a cylindrical inner periphery overlapped by said shoulder and snugly fitting around said neck portion, said ring intervening between said port and said shoulder and having a shoulder on its outer periphery seated against the inner rim of said port and a nut threaded on the neck of said plug extending from said port and clamping said locking ring between the shoulder of said plug and the inner rim of said port, securely to retain said plug in said port.*

JEAN MERCIER.
EDWARD M. GREER.

REFERENCES CITED

The following references are of record in the file of this patent or the original patent:

UNITED STATES PATENTS

| Number | Name | Date |
|---|---|---|
| 682,250 | Glauber | Sept. 10, 1901 |
| 1,272,714 | Reinhalter | July 16, 1918 |
| 1,456,178 | Crockett | May 22, 1923 |
| 2,256,835 | Mercier | Sept. 23, 1941 |
| 2,390,319 | Overbeke | Dec. 4, 1945 |